C. H. LOW.
Machine for Preparing Feathers for Dusters.

No. 225,152.   Patented Mar. 2, 1880.

Witnesses.
H. C. Coolies
Jno. C. MacGregor

Inventor
Charles H. Low.
By _____
Attorneys.

UNITED STATES PATENT OFFICE.

CHARLES H. LOW, OF CHICAGO, ILLINOIS, ASSIGNOR, BY MESNE ASSIGNMENT, TO LEONARD A. WATSON, OF ASHTABULA, OHIO.

MACHINE FOR PREPARING FEATHERS FOR DUSTERS.

SPECIFICATION forming part of Letters Patent No. 225,152, dated March 2, 1880.

Application filed September 6, 1877.

*To all whom it may concern:*

Be it known that I, CHARLES H. LOW, of Chicago, county of Cook, and State of Illinois, have invented a new and useful Improvement in Machines for Preparing Feathers for Feather Dusters, which is fully described in the following specification, reference being had to the accompanying drawings, in which—

Figure 1:
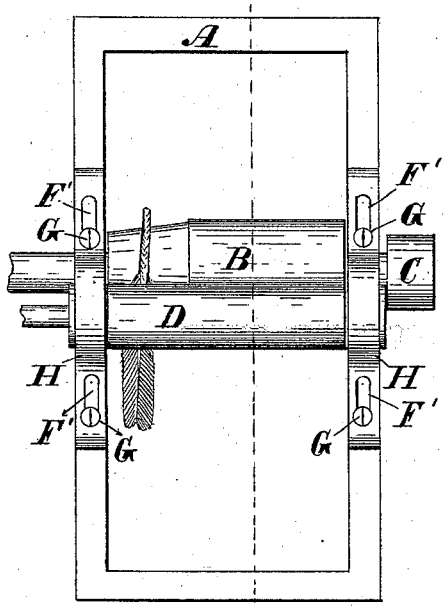
Figure 2:
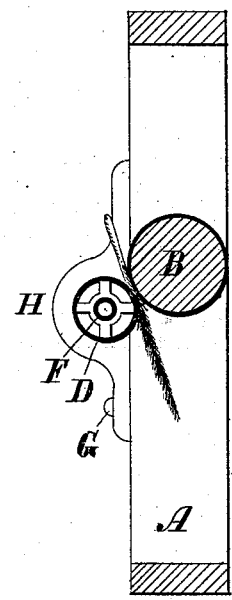
Figure 3:
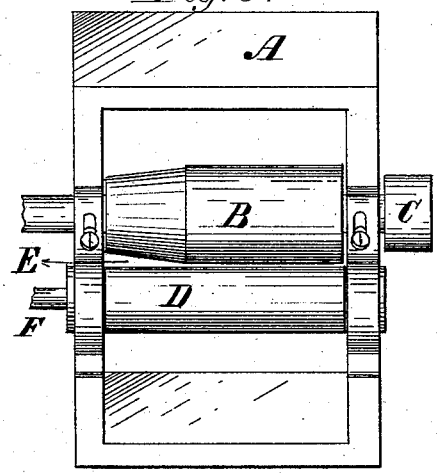
Figure 4:

Figure 1 represents a front elevation; Fig. 2, a transverse sectional view taken at the line $x\ x$, Fig. 1; Fig. 3, a plan view of the two rollers, showing the tapering space between them; and Fig. 4, a longitudinal section of the plain roller, showing a device for heating it.

The object of my invention is to make a machine which will remove the inside or pithy portion of the split stem of a stiff feather and leave a smooth surface, making the feather soft and pliable.

My invention consists in placing two rollers near together, with a tapering space between them. One of these rollers must be provided with a grinding-surface, and they must be so arranged that they will revolve independently of each other. I also prefer to provide one roller with means for heating it, so that when the feather is drawn between the rollers so as to present the inside or pithy part of its stem to the grinding-surface the hot surface of the other roller will cause the feather to bend and hold the plumage away from the grinding-surface.

In the accompanying drawings, A represents the frame of the machine, in which the rollers have bearings.

B is the grinding-roller, and is provided with a surface of sand-paper that can be easily removed and renewed. This roller may be made of emery or any other material suitable for removing the pithy portion of the stem of a feather. It is provided with pulley C, and is intended to be run at a high speed.

D is a roller, placed near the roller B, and the two rollers are so shaped or so arranged as to make a tapering space, E, between them. The feather is put through the wide end of this space, the operator holding it by its quill, by which he draws it obliquely up into the tapering space between the rollers, presenting the pithy part of the shaft to the grinding-roller.

The roller B or the roller D should be reduced at or near one end to leave an opening between the rolls, through which the largest feather may readily be passed without being pressed by the rolls. The surfaces of the rolls in this opening may be smooth. I prefer to make the roll B the rasping-roll, and to taper its end, so as to form the opening for passing the feather through. The cylindrical portion of this roll should be fitted with a rasping or grinding surface, which may be done by means of serrated or toothed metal, or sand, emery, or corundum paper or cloth, attached by any of the well-known methods of attaching such rasping or abrading devices upon the periphery of grinding or milling rolls.

The roll D, which is to support the shaft of the feather in the proper position relative to the rasping-surface of the roller B, is supported on journals which leave it free to turn in either direction by the friction of the shaft of the feather pressed against it by the rasping-roll, so that the shaft of the feather may readily be advanced between the rolls as the pith is removed, or be retracted if advanced too far.

The opening between the rolls is important, because it permits the tip end of the feather, which, being already thin enough, requires no rasping, and would be injured thereby, to be pushed beyond the line of nearest approximation of the grinding and supporting rolls, so that the feather may be moved laterally through the opening to bring that portion of its shaft where the thinning should begin, near the tip, into contact with the rasping-roll.

By means of the adjusting mechanism of the rolls the distance between their two axes can be varied to give more or less taper to the narrow space between the grinding-surface and the rest, to adapt the machine to removing the pith from feathers of different sizes and having backs of different thicknesses.

The shaft of the feather is drawn into the narrow portion of the space gradually as it tapers, so that the pithy portion is entirely removed and the surface left smooth.

I find that by heating the roller D the heat will cause the feather to bend toward the heated surface, so that the plumage is kept from the grinding-surface, and will pass through between the rollers with less liability to injury.

F is a gas-burner, placed within the hollow roller D in such a manner as to heat said roller.

It will be observed that I do not drive the roller D by the application of any power, but leave it to be revolved by drawing the feather over it.

It is not absolutely necessary to have the roller revolve, as the feather would present its shaft to the grinding-surface if the roller D should remain stationary.

F' are slots, through which bolts or screws G fasten the pieces H H, which carry the roller D to the supporting-frame. The attachment is such as to make the rollers adjustable to each other by means of said slots, springs, or other suitable device.

It is very desirable in the manufacture of feather dusters from domestic feathers to remove the pith from the shaft of the feather and make it smooth and limber. Feathers prepared in this way make soft, pliable, and durable feather dusters.

Having thus described my invention, what I claim as new, and wish to secure by Letters Patent, is—

1. In machines for preparing feathers for feather dusters by grinding or rasping the pith from the inner side of the horny back of the split shaft or stem, the combination of a grinding or rasping roll, B, having one end reduced to form an opening for the feather to enter and then pass laterally under the rasping-surface, with a rest to support the feather while being rasped or ground, substantially as described.

2. In machines for the purpose aforesaid, the combination of a grinding or rasping roll, B, reduced at or near one end for the entrance of the feather, with a bearing-roll, D, to support the shaft of the feather under the operation of rasping or grinding, one or both rolls being adjustable to admit of their being set with a tapering opening between them of variable width, substantially as described.

3. In machines for the purpose aforesaid, the combination of the rasping or grinding roll B, constructed as described, with a heated support for the shaft of the feather, whereby the shaft of the feather may be rasped or ground while heated and bent, substantially as described.

CHAS. H. LOW.

Witnesses:
L. A. BUNTING,
W. C. CORLIES.